(No Model.)

F. H. RICHARDS.
WEIGHING MACHINE.

No. 560,545. Patented May 19, 1896.

6 Sheets—Sheet 1.

Witnesses:
Chas. D. King.
Fred J. Dole.

Inventor:
F. H. Richards (No Model.)
F. H. RICHARDS.
WEIGHING MACHINE.
No. 560,545. Patented May 19, 1896.
Fig. 2.
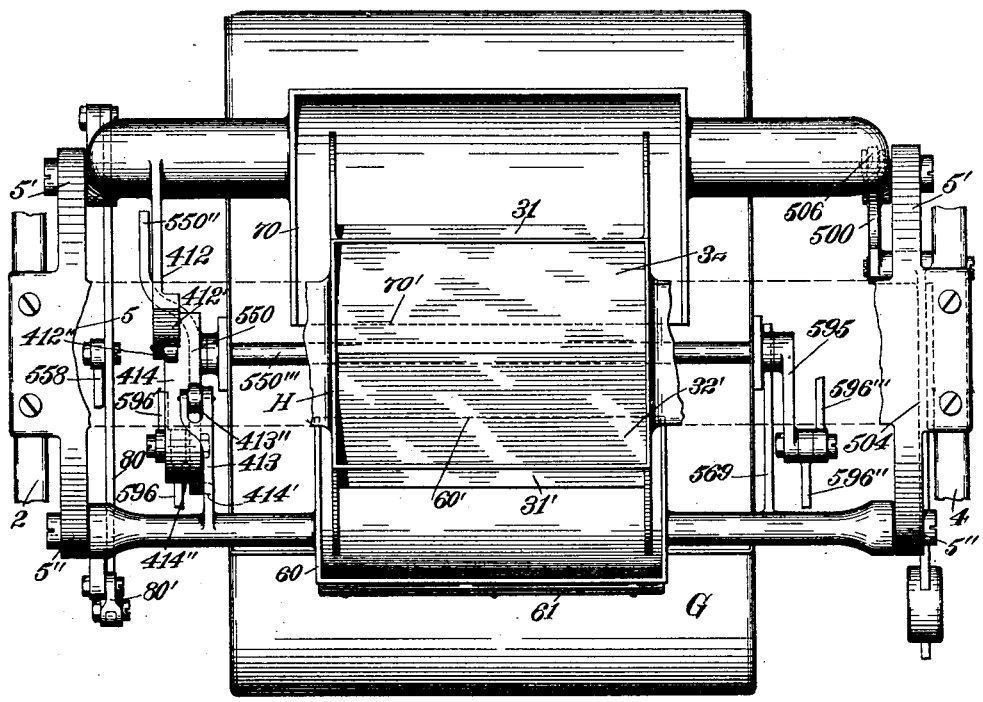
Fig. 8.  Fig. 9.  Fig. 10.  Fig. 11.
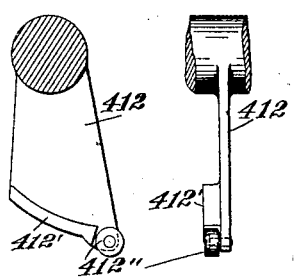
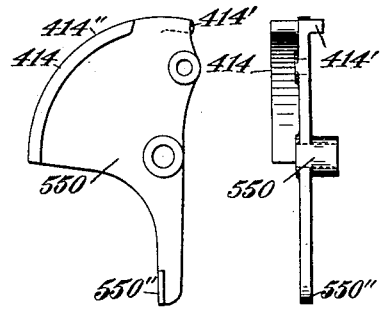
Witnesses:
Chas. D. King.
Fred. J. Dole.
Inventor:
F. H. Richards, (No Model.)  
F. H. RICHARDS.  
WEIGHING MACHINE.

No. 560,545. Patented May 19, 1896.

Witnesses:  
Chas. D. King.  
Fred. J. Dole.

Inventor:  
F. H. Richards.

(No Model.)    F. H. RICHARDS.    6 Sheets—Sheet 5.
WEIGHING MACHINE.

No. 560,545.    Patented May 19, 1896.

Witnesses:
Chas. D. King.
Fred. J. Dole.

Inventor:
F. H. Richards.

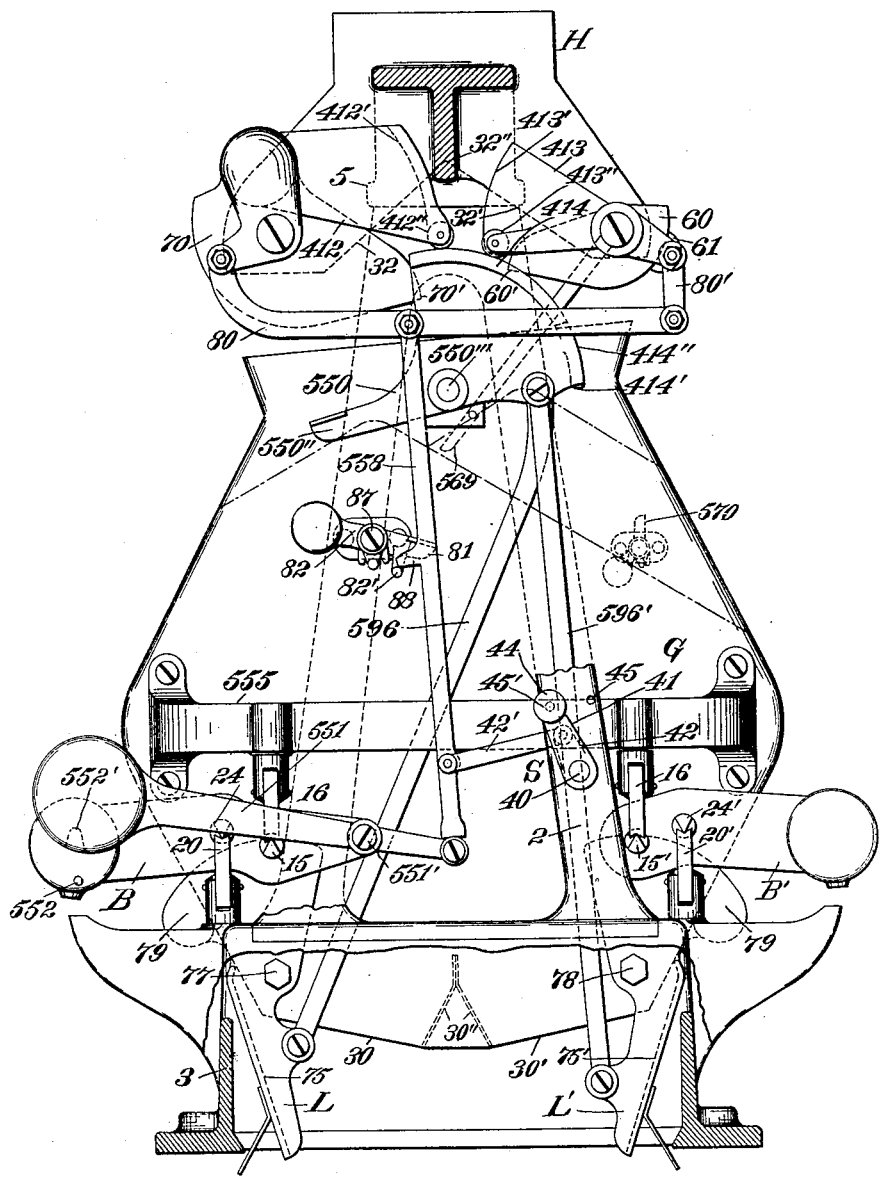

UNITED STATES PATENT OFFICE.

FRANCIS H. RICHARDS, OF HARTFORD, CONNECTICUT.

WEIGHING-MACHINE.

SPECIFICATION forming part of Letters Patent No. 560,545, dated May 19, 1896.

Application filed February 8, 1896. Serial No. 578,546. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, the object being to provide an improved organization of valve and closer mechanisms and an interlocking stop system for such mechanisms, said organization being particularly adapted to weighing-machines of relatively large capacities.

Figure 1:
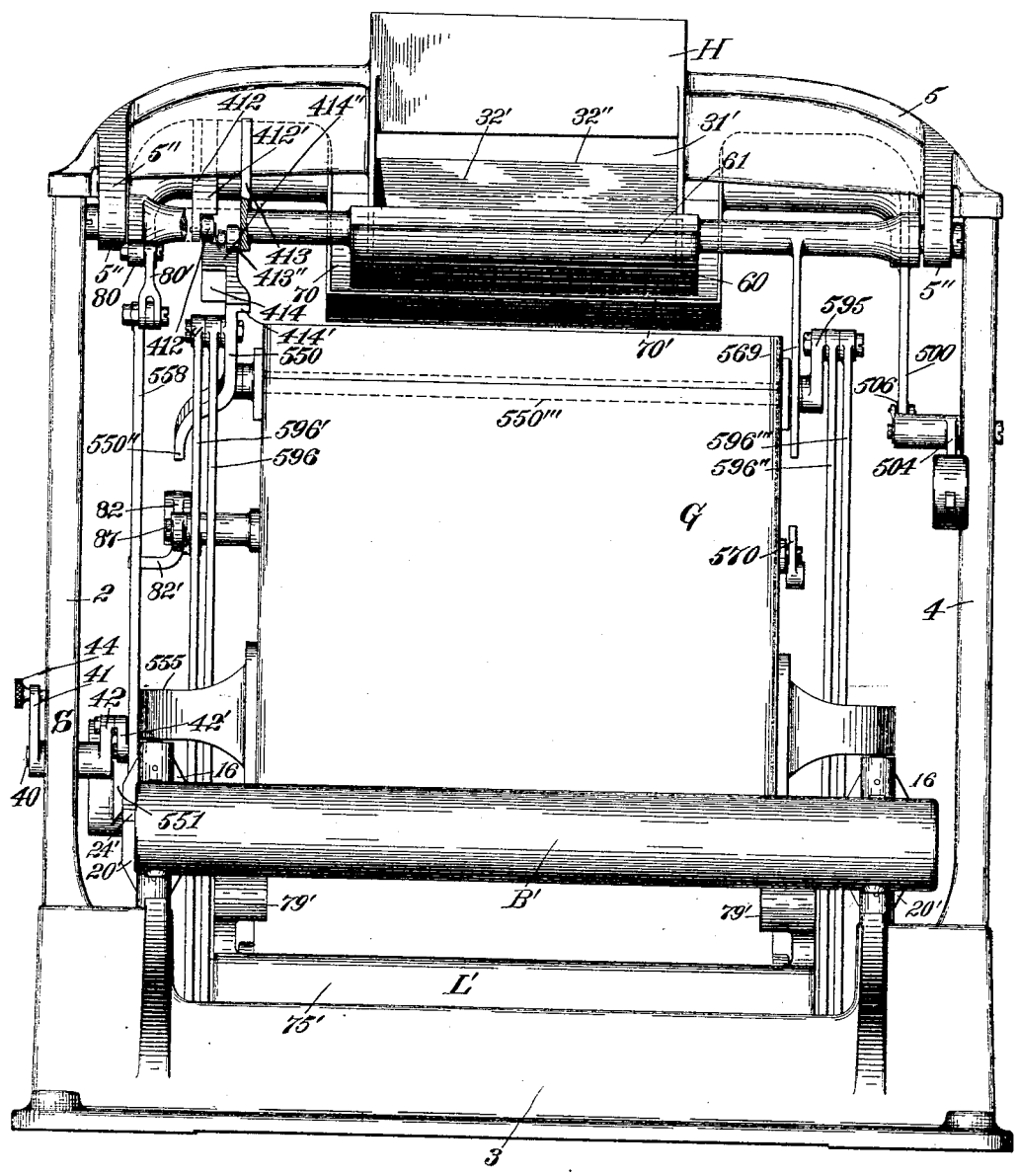
Figure 3:
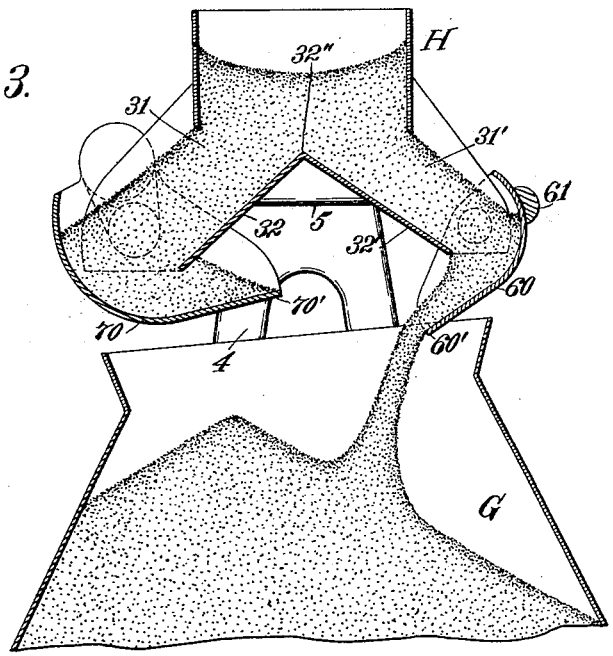
Figure 4:
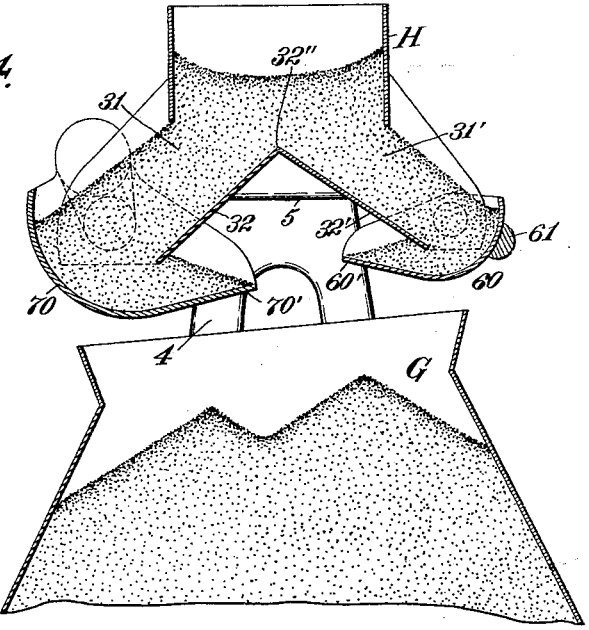
Figure 5:
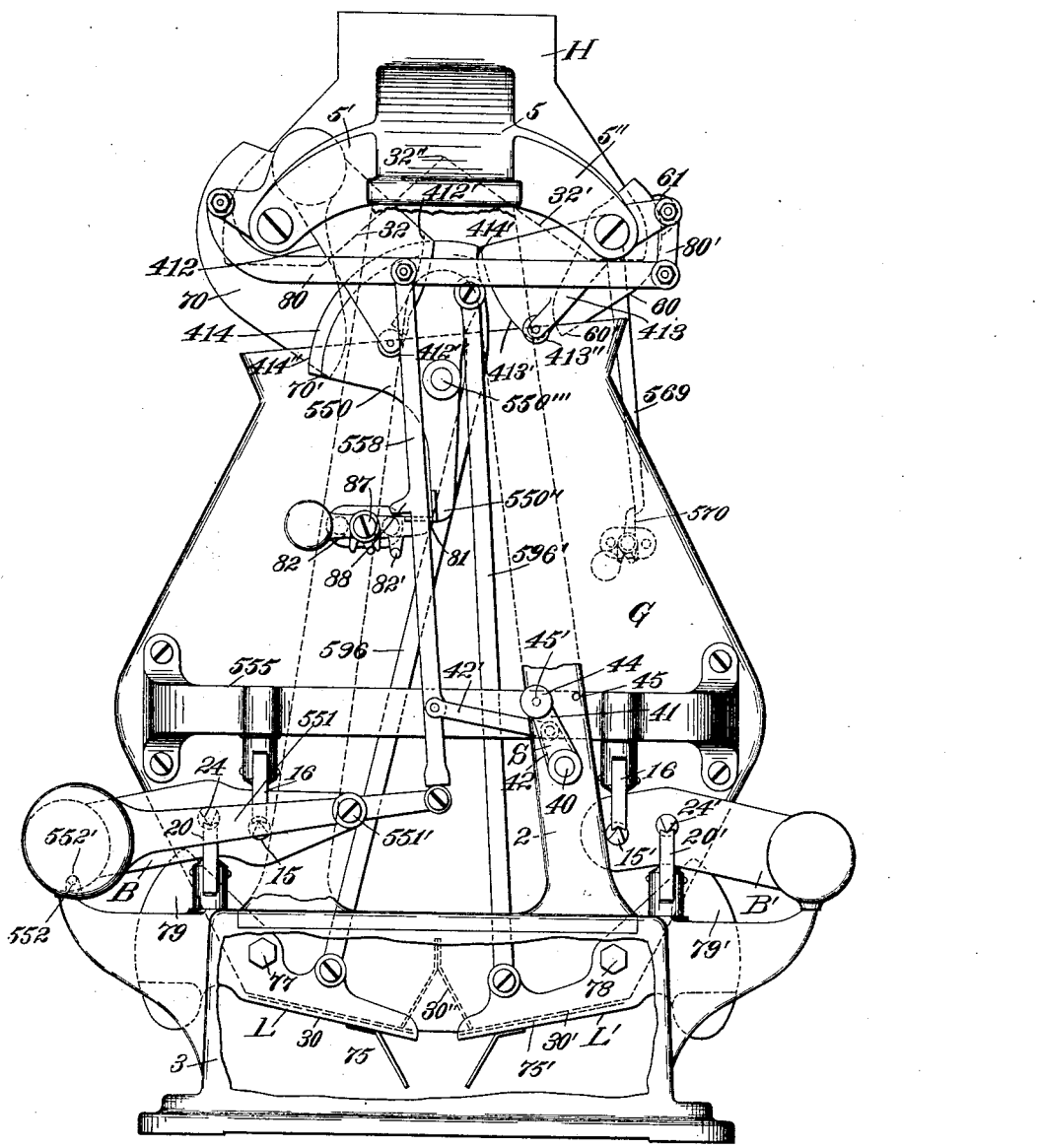
Figure 6:
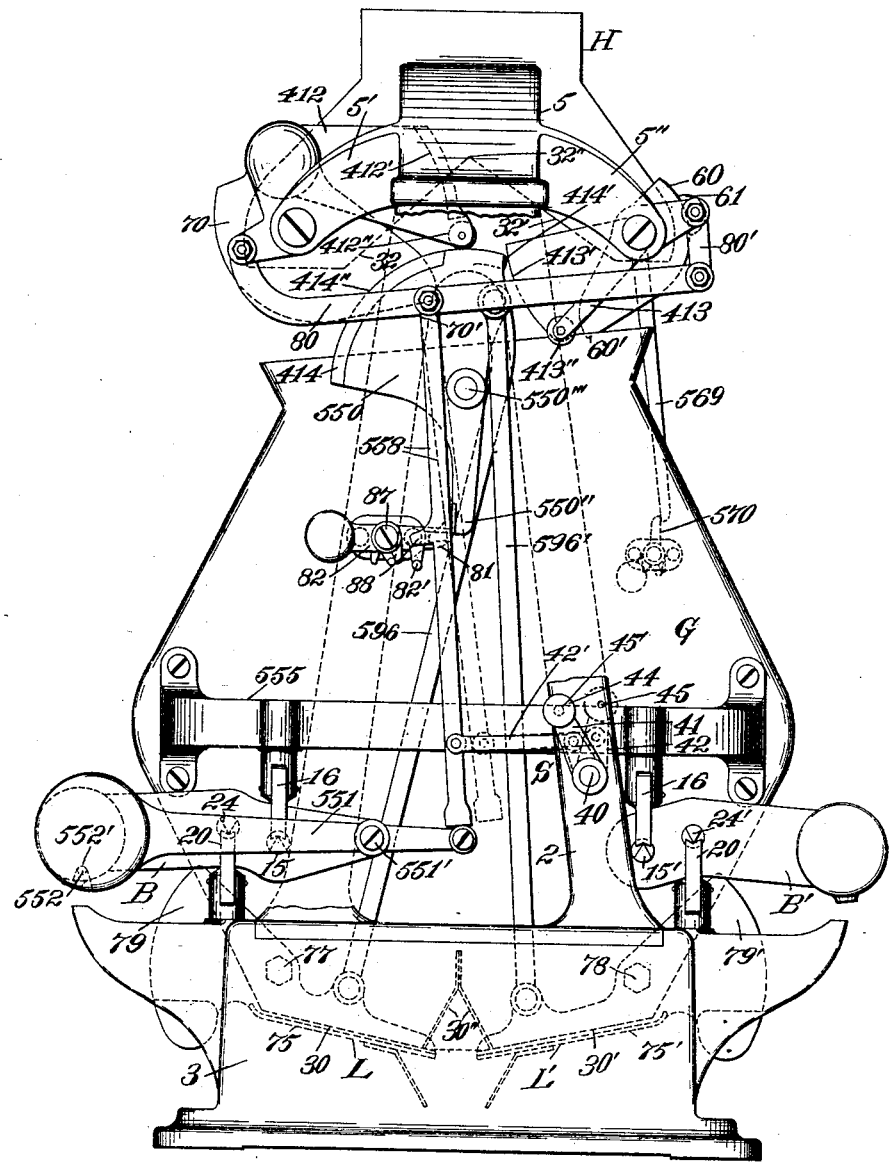

In the drawings accompanying and forming part of this specification, Figure 1 is a front elevation of a weighing-machine embodying my present improvements, the valves thereof being locked closed, and the bucket-closers, only one of which is seen, being partially open for the purpose of discharging the bucket-load. Fig. 2 is a plan view of the upper part of the machine, parts thereof being broken away to better illustrate certain of the improvements. Fig. 3 is a detail view, in vertical transverse section, of the chute, valves therefor, and the upper part of the bucket, the main valve being closed for cutting off the main stream and the supplemental valve being open to permit the flow of the drip-stream into the bucket. Fig. 4 is a similar view illustrating a succeeding step in the operation of the machine, the supplemental valve having been closed for cutting off the drip-stream. Fig. 5 is an end elevation, seen from the left in Fig. 1, and illustrates the respective positions of the operative mechanisms at the commencement of the operation of the machine. Figs. 6 and 7 are similar views illustrating two succeeding steps in the operation of the machine, the valves being in positions corresponding, respectively, with Figs. 3 and 4, Fig. 7 also illustrating both closers open for discharging the bucket-load. Figs. 8 and 9 are detail views, in end and rear elevations, respectively, of a valve-operative stop. Figs. 10 and 11 are detail views, in end and front elevations, respectively, of a closer-operative stop.

Similar characters of reference designate like parts in all the figures of the drawings.

For convenience in illustrating the nature and mode of operation of my present improvements these are shown in connection with a "single-chambered-bucket" weighing-machine, certain features of which are shown and described in prior Letters Patent granted to me, several of which will be hereinafter specifically referred to by date and number, and also briefly described.

The framework for carrying the operative parts of the weighing-machine may be of any suitable construction and is illustrated in the drawings comprising two side frames or uprights 2 and 4, mounted upon a chambered supporting-base 3 and connected by a top plate 5, which latter is illustrated carrying a hopper H, to be hereinafter more particularly described.

The chambered base 3 is illustrated carrying the V-shaped bearings 20 and 20', which constitute beam-supports for supporting the beam mechanism.

The beam mechanism consists of the oppositely-disposed counterweighted scale-beams B and B', which latter are illustrated carrying pivots or knife-edges 24 and 24', which are pivotally supported by the V-shaped bearings 20 and 20', carried by the base of the machine. The scale-beams at points intermediate the pivots or knife-edges 24 and 24' are illustrated carrying bucket-supports in the form of pivots or knife-edges 15 and 15' for pivotally supporting the bucket mechanism, consisting of the bucket and its operative devices, and the bucket is illustrated carrying hangers 555 on each end thereof, which are provided with the V-shaped bearings 16, which correspond in number and position with the pivots or knife-edges 15 and 15' carried by the scale-beams and which are supported thereby.

The weighing-machine embodies the usual poising and counterpoising mechanisms. All that part of the beam mechanism located outside of the beam-supports constitutes the counterpoising mechanism, and all that part of the beam mechanism located between said beam-supports, including the bucket mechanism, which is supported by the beam mechanism for ascending and descending movements therewith, constitutes the poising mechanism.

The bucket, which is designated in a general way by G, is illustrated as being of relatively considerable width, thereby materially increasing the capacity of the machine, and it is so supported by the beam mechanism as to receive the supply of material to be weighed in the form of a stream or streams of material from the hopper H.

The relatively wide bucket G is illustrated having two discharge-openings 30 and 30', which are separated by the inverted-Y-shaped partition or wall 30''. These discharge-openings are illustrated provided with bucket-closers, the bucket-closer for the discharge-opening 30 being designated by L, and the bucket-closer for the discharge-opening 30' being designated by L'.

The bucket-closers L and L' are shown consisting of suitably-formed plates or closers proper, 75 and 75', having counterweighted arms or plates 79 and 79', preferably formed integral therewith, the closers being also illustrated pivoted at 77 and 78 to the lower opposite sides of the bucket and adjacent to one side of the discharge-openings 30 and 30' thereof.

As a means for supporting the bucket-closers L and L' inverted toggles comprising three members are illustrated operatively connecting the closers L and L' with the bucket G. In the form illustrated these toggles comprise the toggle members or connecting-rods 596 and 596', which are illustrated pivotally connected with the bucket-closers L and L', respectively, and also with the toggle member or rocker 550, which is illustrated pivotally supported by the bucket G, said support for the latter being illustrated as a rock-shaft 550''', extending through the bucket. The ends of the rock-shaft are illustrated journaled in tubes riveted into the end walls of the bucket, to thereby prevent spreading of the latter at these points.

The rock-shaft 550''' at the end opposite to that carrying the rocker 550 is illustrated provided with a rock-arm 595, operatively connected with the connecting-rods 596'' and 596''', which constitute additional supports for the bucket-closers L and L', to which they are respectively connected.

The closer-supporting toggles are inverted, and the rocker or toggle member 550 is illustrated supported at a point near the upper edge and approximately centrally of the bucket. In the embodiment illustrated the rocker 550 is so positioned on the bucket G that the pivots of the two connecting-rods 596 and 596', which are also pivotally connected with the bucket-closers L and L', will be above the rocker-pivot when said closers are in the closed positions thereof, whereby said connecting-rods will exert a minimum pressure on the rocker-pivot 550'''. It will be observed that said rocker-pivot is approximately coincident with a straight line passing through the two pivots of one of said connecting-rods, (herein illustrated as the connecting-rod 596,) so that, by reason of this peculiar organization, the leverage of said rods on said rocker-pivot is materially reduced, the connecting-rod 596 tending to neutralize the pressure of the connecting-rod 596' on said rocker-pivot.

The closer-latch for locking the rocker in position when the closers are shut is designated by 82 and is shown pivoted at 87 on one end of the bucket G and having a detent or stop 81, adapted for engaging a coöperating stop 550'' on the rocker or toggle member 550, when the parts are in the closed position previously described. The bucket-closer latch 82 is shown counterweighted, and the movement thereof toward the stop on the rocker will be limited by suitable stops.

It will be observed that in the embodiment illustrated the closer-latch 82 swings upwardly to engage the stop 550'' on the rocker 550 and is released from engagement therewith by a downward movement, so that when the latch and rocker-stops 81 and 550'', respectively, are disengaged the weight of the contents of the bucket, the closers L and L' being at this point in the operation of the machine free from all restraint, will force said closers open for discharging the bucket-load.

The supply-hopper H for containing the mass of material to be weighed, and which in practice may be supplied by a suitable elevator apparatus or other equivalent means, is illustrated comprising two communicating chutes 31 and 31', which constitute, respectively, a main chute for supplying a main stream which is of relatively large volume and a supplemental or drip chute for supplying a drip-stream which flows into the bucket during and succeeding the flow of the main stream, the purpose of the latter being to complete or top off the partial bucket-load. The supply-hopper is shown embodying the walls 32 and 32', which are oppositely inclined and which converge at 32'' and which constitute stream-directing plates for oppositely directing into the two valves 70 and 60 the main and the drip streams which flow from the hopper H, said valves also acting as chutes for directing the mass or supply into the bucket G.

As a means for controlling the main and drip streams which flow from the hopper H, I prefer to employ the valves illustrated, which are substantially similar to the improved valve shown and described in Letters Patent No. 535,727, granted to me March 12, 1895, the valve 70 constituting a main valve for controlling the main stream, and the valve 60 constituting a supplemental or drip valve for controlling the drip-stream.

The valves 70 and 60 are illustrated pivotally supported for oscillatory movement between arms or brackets 5' and 5'', depending from the top plate 5 of the machine, and each located substantially beneath the mouths of the chutes 31 and 31', and as also projecting inwardly beyond the edges of said chutes to support the descending column or stream when said valves are closed.

It will be observed that the oppositely-inclined stream-directing plates 32 and 32' direct the two streams of material toward the rear of and into the concavities formed in the two valves and away from the discharge edges of the latter, so that the power necessary to close the same may be reduced to a minimum. It will also be observed that the discharge edges 70' and 60' of the two valves 70 and 60 face in opposite directions, so that during the closing movement thereof the two streams will be directed toward the middle of the bucket and evenly distributed therein, so that there will not be a preponderance of weight at either side of a vertical line passing through the center of the bucket. The two valves are independently supported, and the supplemental valve is normally held in an open position, so that the main and drip streams may simultaneously flow into the bucket G up to the poising period, and so that the supplemental valve may direct an undiminished drip-stream into the bucket succeeding the cut off of the main stream.

As a means for closing the main valve 70 I prefer to employ the actuating mechanism shown and described in Letters Patent No. 548,843, granted to me October 29, 1895. This mechanism comprises a cam 500, depending from and oscillatory with the valve 70, and having a cam-face in position to be engaged by a valve-closing actuator.

A valve-closing actuator is illustrated at 504 as a counterweighted lever pivoted to the side frames 4 of the machine, and having an antifriction-roll 506 for engaging the cam-face of the valve-closing cam 500, to thereby close said valve.

As a means for closing the supplemental valve 60 a counterweight 61 is illustrated carried thereby at a point to the rear of the pivot or axis of movement thereof.

It will be understood that the main and the supplemental valves have their closing movements in succession, but will be opened in unison, and a single actuator is illustrated for effecting this last-mentioned operation.

The two valves 70 and 60 are illustrated operatively connected, a connector 80 being shown for this purpose. The latter is illustrated operatively connected with the main valve at a point to the rear of the pivot thereof, so that any upward pressure exerted on said connector will open the main valve to thereby permit the main stream to flow into the bucket G. The supplemental valve is also illustrated operatively connected with the connector 80 through the medium of the interposed connecting-link 80', and it will also be evident that the upward pressure exerted on the connector 80 will also open the supplemental valve 60.

By reason of the peculiar form of connection of the supplemental valve 60 with the connector 80 the main valve 70 may be closed independently of and without affecting the supplemental valve, the latter being normally open, means to be hereinafter described being employed for holding the said supplemental valve against closing movement.

The connector 80 is illustrated carrying, approximately midway between its ends, the depending member or rod 558, which is in position to be engaged by a valve-actuator to thereby also actuate the valves 70 and 60 for opening the same.

The scale-beam B is illustrated carrying a two-stroke supplemental counterpoise 551, constituting a valve-opening actuator, and pivoted thereto at 551', which normally forms a part of the counterpoising mechanism, a stop 552, carried by the scale-beam B, engaging a stop-face 552', carried by said supplemental counterpoise or lever 551, being illustrated for maintaining the latter in said normal position. This supplemental counterpoise 551, as just stated, normally forms a part of the counterpoising mechanism, (see Fig. 5,) but is shiftable therefrom and onto the poising mechanism (see Fig. 7) and is operable on the return stroke thereof for engaging the lower end of the depending rod 558, carried by the connector 80, whereby an upward thrust will be imparted to said connecting-rod 558 for opening the pair of valves 70 and 60 through the operative connections with said rod 558.

At the commencement of operation of the machine the main and the supplemental valves 70 and 60 will both be open to permit the simultaneous flow of the two streams. During the descent of the bucket the main valve will be slowly closed for first reducing in volume and then cutting off the main stream. At the commencement of the poising period, the main valve 70 having been closed, the load will be nearly completed, the supplemental valve 60 being open and held in such position to permit the flow of the drip-stream into the bucket for the purpose of completing the bucket-load therein.

As a means for holding the supplemental valve 60 against closing movement I prefer to employ the stop or detent shown. This stop or detent is illustrated carried by the poising mechanism, being shown as a by-pass 570, pivotally supported by the bucket G, and having the upper or vertical arm thereof in position for engaging the stop-arm 569, which is illustrated carried by the supplemental valve. This by-pass is in the nature of a counterweighted lever, suitable stops being employed for limiting the movement thereof during its engagement with the stop-arm 569, carried by the supplemental valve. The length of the upper arm of the by-pass 570 relatively to the stop-arm 569 is such that said stop-arm 569 will be released by said by-pass 570 at the close of the poising period or when the bucket G descends below the poising-line, so that the supplemental valve 60 may be instantly closed by the counterweight or valve-closer 61, carried thereby. On the opening movement of the supplemental valve 60 the stop-arm 569 thereof will engage the upper arm of the by-pass 570 and swinging the same about its pivot will be permitted to resume its normal position, and succeeding this operation the by-pass 570 will return to its normal position to again prevent the closing movement of the supplemental valve 60 until the bucket G goes below the poising-line on the succeeding operation of the machine.

There is illustrated as operative with the valves a pair of closer-movement limiters and as operative with the closer or closers a valve-movement limiter, said first-mentioned members being operative for limiting the opening movement of the closer or closers should by any possibility the closer-latch 82 fail to work, and said last-mentioned member being operative for limiting the opening movement of the valves while the bucket closer or closers are open or during the bucket-discharging period.

The main and the supplemental valves 70 and 60 are illustrated provided, respectively, with the stops 412 and 413 operative therewith, which constitute valve-operative stops, and the bucket-closer is illustrated having operative therewith a closer-operative stop, which is illustrated as the rocker 550, and these stops are so positioned that said last-mentioned stop serves as a stop device for the other two members, and vice versa.

The valve-operative stop 412 (see Figs. 8 and 9) is illustrated provided with a segmental flange 412', which constitutes a supplemental stop, and the closer-operative stop 550 is shown provided with a similar flange 414, (see Figs. 10 and 11,) which also constitutes a supplemental stop and which coacts with the first-mentioned supplemental stop 412', carried by the valve-operative stop 412. During the closing movement of the main valve the supplemental stop 412', by engaging the supplemental stop 414 on the closer-operative stop 550, (see Fig. 5,) positively limits or prevents the opening movement of the bucket-closer or bucket-closers should the latter be accidentally released or by reason of the failure of the bucket-closer latch 82 to properly work. The working face of the supplemental stop 412' is illustrated as curved, the curvature thereof being concentric with the axis of movement of the main valve 70, so that the closing movement of said valve 70 will not be checked by the supplemental stop 414. When the main valve 70 has cut off the main stream, it will be evident that the supplemental stop 412' will have passed beyond the working edge of the supplemental stop 414. (See Fig. 6.)

Additional safety devices are provided for limiting the opening movement of the bucket-closer or bucket-closers on the closure of the main valve 70 and while the supplemental valve is still open, so that the opening movement of the bucket-closer or bucket-closers is positively prevented until both valves have cut off the streams of material which they control.

The closer-operative stop member 550 is illustrated provided with a second supplemental stop 414', which coacts with the supplemental stop-face 413' of the valve-operative stop member 413, so that if the bucket-closer should be released at a point succeeding the cut off of the main stream and while the drip-stream is flowing into the bucket the supplemental stop 414', impinging against the supplemental stop-face 413' of the stop member 413, the latter serving practically as a fixed abutment, the opening movement of the bucket-closer or bucket-closers will be positively limited.

The supplemental stop or stop-face 413' is illustrated as curved, the curvature thereof being concentric with the axis of movement of the supplemental valve 60, so that the closing movement of the latter cannot be prevented so long as these stops are in contact.

The closer-operative stop member 550 is illustrated provided with a curved working face or supplemental stop 414'', the peculiar function of which will now be described. The valve-operative stop members are illustrated provided with a second pair of supplemental stops in the form of antifriction-rolls 412'' and 413'', respectively. When the main valve 70 has closed, it will be remembered that the supplemental stop 412' passes beyond or out of contact with the supplemental stop 414, and this movement continues until the supplemental stop or antifriction-roll 412'' has crossed the plane or curvature of the stop-face 412. As the valve-operative stop member 413 oscillates the roll 413'' thereof will be carried therewith until this has intersected the plane of curvature of the supplemental stop or working face 414'', (see Fig. 7,) at which time the stop member 550, being free of all restraint, may oscillate about its pivots, whereby on this movement of said stop member 550 the bucket-closer or bucket-closers will be opened for discharging the bucket-load. As the stop member 550 oscillates about its pivot the working face 414'' of said stop member 550 will be in contact with the supplemental stop 413'' of the valve-operative stop 413 and the upper face of the flange, this being concentric with the curved face 414'', will engage the supplemental stop or antifriction-roll 412'', whereby, so long as this engagement continues, said stop member acts as a stop device and prevents the opening movement of the two valves 70 and 60. On the return oscillation of the stop member 550 and the closing movement of the bucket-closers L and L' and when the latter have been closed or nearly closed the supplemental stop 412' will pass out of contact with the upper curved face of the flange or stop 414, and the supplemental stop or roll 413'' will pass out of contact with the curved working face or stop 414'' of the stop member 550, whereby the two valves may be then opened to again permit the flow of the two streams into the empty bucket.

It will be remembered that a latch 82 has been described normally engaging the closer-supporting means, to thereby hold the bucket-closer or bucket-closers against opening movement, said latch being provided with a detent 81 for engaging a coöperating detent 550'' on the rocker 550, which latter constitutes a part of the closer-supporting means; and it will be remembered that said latch has been also described as released from engagement with said rocker by a downward movement or pressure exerted thereon.

The latch 82 is illustrated, at a point forward of the pivot thereof, provided with a stop or pin 82' in position to be engaged by an actuator or releaser device. As a means for tripping the latch 82 I prefer to employ an actuator carried by the connector 80, which operatively connects the two valves 70 and 60. Such an actuator is illustrated at 88 and carried by the depending member or connecting-rod 558, which is suspended from the connector 80. During the closure of the main valve 70 this depending member 558, which carries the actuator 88, will have a slow descending movement. At the commencement of the poising period, the main valve having cut off the main stream, the actuator 88 will be nearly in engagement with and over the stop-pin 82' on the latch 82, the supplemental valve 60, however, being still held in its open position by the stop 570 engaging the stop-arm 569 of the supplemental valve.

When the bucket-load is completed by the drip-stream, the bucket descends below the poising-line and the stop 570 will be carried therewith, and will thereby release the stop-arm 569 of the supplemental valve, so that said supplemental valve 60 may be closed. As the supplemental valve closes a downward thrust will be imparted to the connecting-rod 558 by the supplemental valve through the interposed connector 80, and the connecting-link 80' and the actuator 88 will be forced into engagement with the stop-pin 82' of the bucket-closer latch, thereby depressing the latter and disengaging the detents 81 and 550'' of the latch and rocker, respectively, so that the bucket-closer or bucket-closers L and L', being free of all restraint, may be opened for discharging the bucket-load.

The connecting-rod 558, which is carried by the valve-connector 80, is normally in operative engagement with the two-stroke shiftable member 551, which latter constitutes the means for simultaneously opening the two valves by imparting an upward thrust to said connecting-rod 558 as said shifting member 551 returns to its normal position, as indicated in Fig. 5.

A shifter or shifting means, which is designated in a general way by S, is provided for shifting the connecting-rod 558 from its normally operative position when it is desired to make a test for ascertaining the accuracy of a completed bucket-load; or said connecting-rod 558 may be thrown into its inoperative position at the close of a day's work.

The framework of the machine is illustrated carrying a rock-shaft 40, to the outer end of which is secured the handle 41, by which said shaft may be rocked, and on the inner end thereof is shown formed a rock-arm 42, which is operatively connected with the connecting-rod 558 by the connecting-link 42'. The handle 41 is provided with a spring pin or bolt in the thumb-piece 44 thereof, which may be seated in either one of the two openings 45 and 45' formed in the framework.

On reference to Fig. 6, which shows in full lines the connecting-rod 558 in its normally operative position, the spring-pin of the thumb-piece 44 is seated in the opening 45', formed in the framework. When it is desired to make a test, the thumb-piece 44 is grasped and the spring-pin therein withdrawn from the opening 45', and said handle is turned to the right, so that the rock-shaft 40 and the rock-arm 42 thereon will also be rocked to the right, and the connecting-rod 558 will be drawn in a coinciding direction. By reason of its operative connection with the rock-arm 42, these shifted positions being indicated by the dotted lines in said Fig. 6, the connecting-rod 558 then being out of its normal position cannot be engaged by said shiftable member 551 on the return stroke thereof.

Briefly described the operation of a weighing-machine embodying my present improvements is as follows: Fig. 5 illustrates respective positions of the operative mechanism at the commencement of the operation of the machine, both closers being closed and both valves being open, the supplemental valve being held against closing movement by the stop 570 on the bucket G engaging the stop-arm 569 of the supplemental valve. The valves 70 and 60 being open the two streams (the main and the drip) will flow from the hopper H into the empty bucket. When a certain portion of the mass has been received by the bucket, this tends to descend and in descending the main valve 70 will be slowly closed for slowly reducing the volume of and subsequently cutting off the main stream. On the cut off of the main stream (see Fig. 6) the supplemental valve 60 will still be held in its open position to permit the flow of the drip-stream into the bucket for the purpose of completing the bucket-load therein. When the bucket-load has been completed by the drip-stream, said bucket descends below the poising-line, at which latter point in the operation of the machine the stop 570 will release the stop-arm 569 of the supplemental valve 60, so that the valve-closer 61 thereof may instantly close said supplemental valve for cutting off the drip-stream. At a point near the final closing movement of the supplemental valve the actuator 88 will be thrust downwardly and, succeeding the cut off of the drip-stream, will engage the stop-pin 82', thereby depressing the latch 82 and disengaging the latch and rocker-detents 81 and 550'', at which time the bucket-closers L and L', being free from all restraint, may be forced open by the weight of the bucket contents, which are supported by said closers L and L', whereby the bucket-load will be discharged.

Having thus described my invention, I claim—

1. In a weighing-machine, the combination with a bucket having a closer, and with a pair of successively-closing valves; of a pair of closer-movement limiters, one of them operative with each of said valves; and a valve-movement limiter operative with said closer.

2. In a weighing-machine, the combination with a bucket having a closer, and with a pair of successively-closing valves; of a pair of stops, one of them operative with each of said valves; a stop operative with said closer, and having said last-mentioned stop in position for serving as a stop device for the other stops, and vice versa.

3. In a weighing-machine, the combination with a bucket having a closer, and with a valve; of stops operative, respectively, with said closer and valve, each of said stops having a flange constituting supplemental stops, one of which latter limits the movement of the other.

4. In a weighing-machine, the combination with a bucket having a closer, and with a valve; of stops operative, respectively, with said closer and valve, each of said stops having a flange constituting supplemental stops, and having the supplemental stop of the valve-operative stop in position for limiting the other supplemental stop; and a second pair of supplemental stops on said stops, one of which engages the other to thereby limit the movement of the latter.

5. In a weighing-machine, the combination with a bucket, and with a hopper; of a pair of valves for said hopper; a connector operatively connecting said valves; a depending member carried by said connector; and an actuator operable for engaging said member, to thereby actuate said valves.

6. In a weighing-machine, the combination with a bucket, and with a hopper; of a pair of valves for said hopper; a closer for said bucket; closer-supporting means, a latch for the latter; a connector operatively connecting said valves; and an actuator carried by said connector for said latch.

7. In a weighing-machine, the combination with a chute, of a pair of valves therefor; a connector operatively connecting said valves; a depending member carried by said connector; a valve-actuator for engaging said depending member to thereby open the valves; and shifting means operable for shifting said depending member out of operative relation with said actuator.

8. In a weighing-machine, the combination with a bucket having a pair of closers, of a chute; a pair of valves for said chute, each having a closer-movement limiter; a connector operatively connecting said valves; closer-supporting means embodying a valve-movement limiter, and having said last-mentioned limiter in position for limiting the movement of said other limiters, and vice versa.

9. In a weighing-machine, the combination with a chute, of a pair of independently-supported valves therefor; a connector operatively connecting said valves; a depending stop-arm carried by one of said valves; a stop carried by the poising mechanism for engaging said stop-arm at a predetermined point in the closing movement of said valve, and to also release said valve; and valve-actuating mechanism.

10. In a weighing-machine, the combination with a single-chambered bucket; of a partition so supported therein as to form two discharge-outlets; a closer for each of said outlets; a rocker pivotally supported by the bucket, and having two connecting-rods pivotally connected with said rocker and also to the bucket-closers, and having said first-mentioned pivots located above the rocker-pivot when said bucket-closers are shut; and a latch for engaging said rocker.

FRANCIS H. RICHARDS.

Witnesses:
FRED J. DOLE,
HENRY BISSELL.